(12) United States Patent
Halligan et al.

(10) Patent No.: US 6,311,256 B2
(45) Date of Patent: *Oct. 30, 2001

(54) COMMAND INSERTION AND REORDERING AT THE SAME STORAGE CONTROLLER

(75) Inventors: Kenneth A. Halligan, Leominster; Erez Ofer, Brookline; John T. Fitzgerald, Mansfield, all of MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,380

(22) Filed: Jun. 30, 1997

(51) Int. Cl.[7] .............................. G06F 12/08; G06F 13/18
(52) U.S. Cl. ............................ 711/158; 711/151; 711/152
(58) Field of Search .................................... 711/111, 158, 711/163, 146, 144, 141, 167, 168, 152, 151; 710/6, 7

(56) References Cited

U.S. PATENT DOCUMENTS

| | | | |
|---|---|---|---|
| 4,855,904 | * 8/1989 | Daberkow et al. | 711/109 |
| 5,341,491 | * 8/1994 | Ramanujan | 711/152 |
| 5,455,924 | * 10/1995 | Shenoy et al. | 711/152 |
| 5,548,795 | * 8/1996 | Au | 710/52 |
| 5,590,379 | * 12/1996 | Hassler et al. | 711/141 |
| 5,649,157 | * 7/1997 | Williams | 711/151 |
| 5,652,859 | * 7/1997 | Mulla et al. | 711/144 |
| 5,729,718 | * 3/1998 | Au | 711/167 |
| 5,905,998 | * 5/1999 | Ebrahim et al. | 711/144 |
| 5,961,621 | * 10/1999 | Wu et al. | 710/107 |
| 6,047,334 | * 4/2000 | Langendorf et al. | 710/5 |
| 6,078,998 | * 6/2000 | Kamel et al. | 711/151 |
| 6,088,772 | * 7/2000 | Harriman et al. | 711/158 |
| 6,112,265 | * 8/2000 | Harriman et al. | 710/40 |
| 6,145,052 | * 11/2000 | Howe et al. | 711/112 |

* cited by examiner

Primary Examiner—Matthew Kim
Assistant Examiner—Pierre-Michel Bataille
(74) Attorney, Agent, or Firm—John M. Gunther, Esq.; Leanne J. Fitzgerald, Esq.; Christopher K. Gagne, Esq.

(57) ABSTRACT

The invention relates to a method and apparatus for reordering, at a disk drive controller, a received sequence of read and write commands. The reordering can be system driven so that the system, when a command stalls, examines the command queue for another command to execute. Alternatively, the command queue itself can be reordered depending upon the expected time it takes for various commands to execute. Reordered commands can be flagged so that they cannot be reordered again. The resulting increase in throughput and efficiency occurs without reference to the particular disk drive or disk drive array configuration to which the controller is connected.

11 Claims, 4 Drawing Sheets

COMMAND INSERTION AND REORDERING AT THE SAME STORAGE CONTROLLER

BACKGROUND OF THE INVENTION

The invention relates generally to mass storage devices, and in particular, to methods and apparatus for improving performance by modifying the controller for a mass storage system.

Disk drive systems have grown enormously in both size and sophistication in recent years. These systems can typically include many large disk drive units controlled by a complex, multi-tasking, disk drive controller such as the EMC Symmetrix disk drive controller. A large scale disk drive system can typically receive commands from a number of host computers and can control a number of disk drive mass storage devices, each mass storage device capable of storing in excess of several gigabits of data.

There is every reason to expect that both the sophistication and the size of the disk drive systems will continue to increase. As the systems increase in complexity, so does the user's reliance upon the system, for fast and reliable recovery and storage of data. Accordingly, the user typically uses data throughput and speed of response as a primary criteria for evaluating performance of the disk drive systems. As a result, mass storage devices and the controllers which drive them have become quite sophisticated in trying to improve command response time. Systems such as the EMC Symmetrix disk drive controller system thus incorporate a large cache memory, and other techniques to improve the system throughput.

SUMMARY OF THE INVENTION

The invention relates to a method and apparatus for reordering, at the disk drive controller, a received sequence of read and write commands. In this manner, the data throughput will advantageously be improved.

The method features the steps of determining any time delays in completing an initiated command at the disk drive controller; initiating, if the time delay exceeds allowed criteria, a next selective command in the received sequence; and completing that next selective command while waiting for at least a portion of the originally initiated command to complete. In this manner, the controller is not idly waiting for a command to complete, but in fact will complete commands in a sequence other than that in which they are received. As a result, throughput through the disk drive controller is increased.

Among the criteria, which would result in taking commands out of order, are the expected time to complete for a command, whether there is a cache miss during a read command, and whether write cache is full.

In another aspect, the method of reordering a received sequence of read and write commands at a disk drive controller features the steps of storing the received read and write commands in a command list or queue in the order that they are received at the controller; adding each newly received command to the end of the command list, the command at the beginning of the list being the next command to be executed; moving a selected command from a position more distant from the beginning of the list to a position less distant from the beginning of the list when that selected command can be executed and completed without substantial delay; and executing a command near the top of the list.

In this particular embodiment of the invention, the method can further feature flagging any command which moves to a position at the beginning of the list (as a result of another command or commands being moved closer to the end of the list), and preventing any flagged command from moving further from the beginning of the list (for any reason). In another aspect, the method further features repeating the moving step a plurality of times and wherein the executing step features the step of executing the write instruction closest to the beginning of the list.

The disk controller of the invention relates to reordering a received sequence of read and write commands to increase their throughput. The disk controller features circuitry for determining any time delays in completing an initiated read or write command, circuitry for initiating, if the time delay meets specified criteria, a next selected command in the received sequence, and circuitry for completing that next selected command while at least a portion of the initiated read or write command is completing. In particular embodiments, the specified criteria can be either an expected time to complete threshold, a cache miss during a read operation, or the inability to write data to destaging memory.

In yet another aspect of the invention, the disk drive controller receives a sequence of read and write commands and features storing the read and write commands in a command list in the order in which they are received, circuitry for adding the newly received commands to the end of the list, the command at the beginning of the list being the next command to be executed, circuitry for moving a selected command from a position more distant from the beginning of the list to a position less distant from the beginning of the list when that selected command can be executed and completed without substantial delay, and circuitry for executing a command near the top of the list.

In particular embodiments, the disk drive controller flags any read or write command which is moved to a position at the beginning of the list from a position more distant from the head of the list and prevents any flagged command from being moved away from the head of the list.

Accordingly, the invention provides improved and increased throughput, through the disk drive controller by reordering the read and write commands from the order in which they are received by the disk drive controller. As a result, "down time" at the controller is minimized, and disk drive instructions are using those system resources which are available.

BRIEF DESCRIPTION OF THE DRAWING

Other features and advantages of the invention will be apparent from the following description, taken together with the drawings, in which.

DESCRIPTION OF THE PARTICULAR PREFERRED EMBODIMENTS

Figure 1:
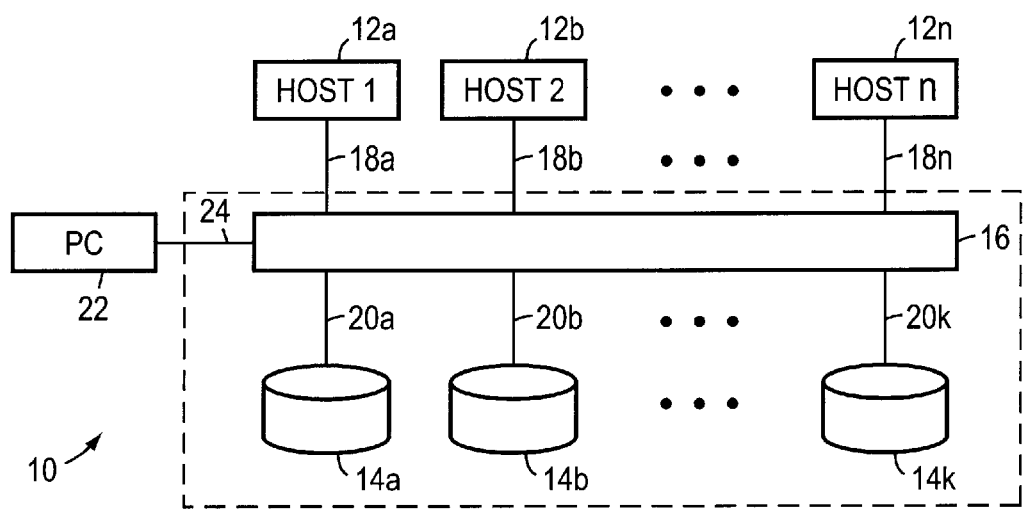
FIG. 1 is a shematic block diagram of a system in accordance with the invention.

Referring to FIG. 1, the invention relates to a computer system 10 which has a plurality of host computers 12a, 12b, . . . , 12n and a mass storage system 13, having a plurality of disk drive elements 14a, 14b, . . . , 14k. Interconnecting the host computers 12 and the disk drive elements 14 is a disk drive controller 16, for example that which is manufactured by EMC Corporation and known as the Symmetrix controller. The disk drive controller 16 receives memory commands, that is, for example, read and write commands, from the various host computers over buses 18a, 18b, . . . , 18n, respectively, for example buses connected and operating in accordance with a SCSI protocol. The disk drive controller 16 delivers data associated with those commands to or from the appropriate disk drive elements 14 over respective connected buses 20a, 20b, . . . , 20k. Buses 20 also preferably operate in accordance with a SCSI protocol. Each of the disk drive elements 14 typically has an excess of 1 gigabit of memory and is logically divided, in accordance with known techniques, into a plurality of logical volumes. Each disk drive element 14 can thus have a plurality of logical volumes, for example, four, eight, or more logical volumes in a single physical disk drive element. In a typical configuration, the controller system also connects to a console PC 22 through a connecting bus 24. Console PC 22 is used for maintenance and access to the controller and can be employed to set parameters of and/or to initiate maintenance commands to the controller, under user control, as is well known in the art.

As indicated above, it can often occur during operation, that the system spends time waiting for system resources, such as cache memory or physical hard drive accesses. As a result, in accordance with the invention, system throughput is improved by changing the sequence in which read and write commands in a command queue are implemented.

To increase system performance, therefore, the disk drive controller reorders and/or inserts SCSI read and write commands from the "natural order" in which they are received from the host or hosts, as presented in the controller's command queue. By strategically reordering and executing media access commands, the system attempts to diminish the time spent waiting for system resources and uses that "waiting time" to execute other commands in the command queue, thus providing an increase in performance and overall throughput. In accordance with the invention, the controller accomplishes this task as follows.

There are two methods which can be used to manipulate the order of execution of the commands received from the host computers and stored in the command queue of the controller. One method is referred to herein as command insertion while the other method is referred to command reordering. In accordance with command insertion method of operation, the disk drive controller will, upon receiving a command over the SCSI bus from a host computer, attempt to promote this command from the end of the queue or list toward its beginning. This method thus advances a read command until either another read command is encountered, or until the read command has reached the head or beginning of the queue. This operation is performed so that a request will thus be expedited at the expense of other slower executing commands.

The command reordering process provides that the disk drive controller actually begins looking from the beginning of the queue toward the end of the queue. The disk drive controller looks for an alternate command to execute if the system resources are not available to complete the current "active" command, that is, the command currently at the head or beginning of the queue. This command reordering process is also implemented immediately after any command is received from a host computer over the SCSI input bus.

Figure 2:
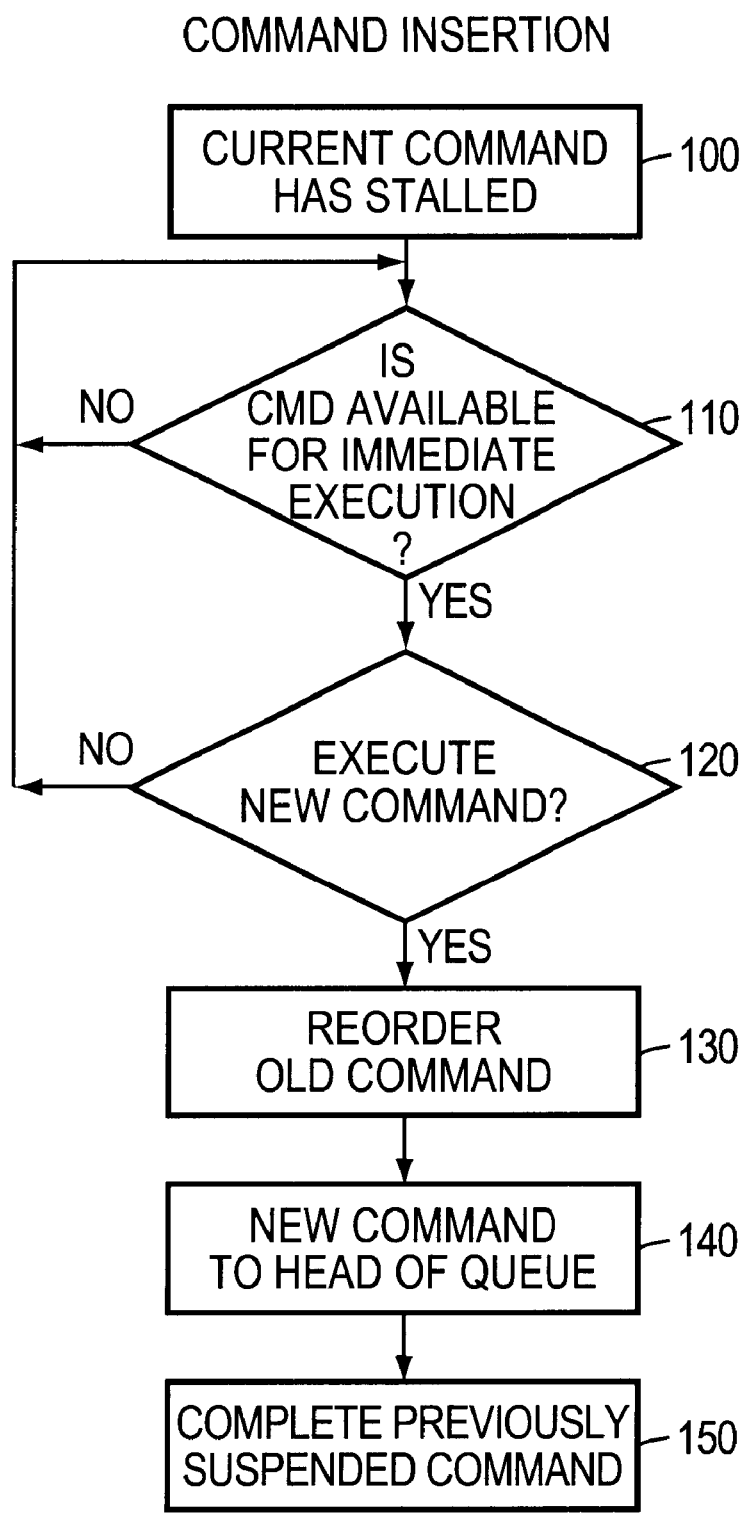
FIG. 2 is a flow chart illustrating a first aspect of system operation in accordance with the invention.

Referring to FIG. 2, therefore, in the command insertion process, the disk drive controller first waits for a previous request for reading or writing data, and which has been initiated, but not yet satisfied. At this moment, therefore, at 100, the current input/output (I/O) operation has stalled (if, for example, there is a cache miss or write cache is full). The disk drive controller uses this opportunity, at 110, to determine if a command exists in the command queue which is either a write command able to be written to cache memory, or a read command, the data for which is entirely in cache memory, and therefore available for immediate execution and completion. If either of these conditions are met, the selected candidate becomes the new command (at 120) if, in accordance with the invention, it has a so-called queue tag associated with it. The disk drive controller will then reorder the current command that is waiting, for example, for read data, with the command that has met the criteria identified above (step 130). The command that is removed from the beginning of the queue becomes inactive and the new command at the beginning of the queue begins to execute and becomes the active command. (Step 140)

Once the new active command has completed execution, this system then reexamines the old "inactive" command, which according to the invention preferably has previously been tagged so that it cannot again be "reordered". The system also checks to determine whether or not it has the data which it requires for proper handling. For a write command, this can involve data being written to a previously full write cache, and for a read command, it can involve the receipt in cache of the required data. This is indicated at 150. The now active command is then completed.

In other embodiments of the invention, however, it is possible and desirable to "intelligently" reorder and change the sequence in which commands are received over the bus and are inserted into the command queue for execution and completion. Thus, it is possible to execute more than one read or write command while waiting for a previously initiated command to finish. In other instances, it can be desirable to identify groups of commands which access the same block or blocks in order to achieve some efficiency based on a locality of reference. Other intelligent command queue manipulation can involve taking commands not only out of their natural sequence, but also out of what might be determined to be the reordered sequence, based solely upon commands closest to the beginning of the command queue or commands which are only read or write commands, using a theory, for example, that the read commands inherently require greater resource delays since the likelihood of a cache miss is greater than, for example, the likelihood that the write cache is full.

Figure 3:
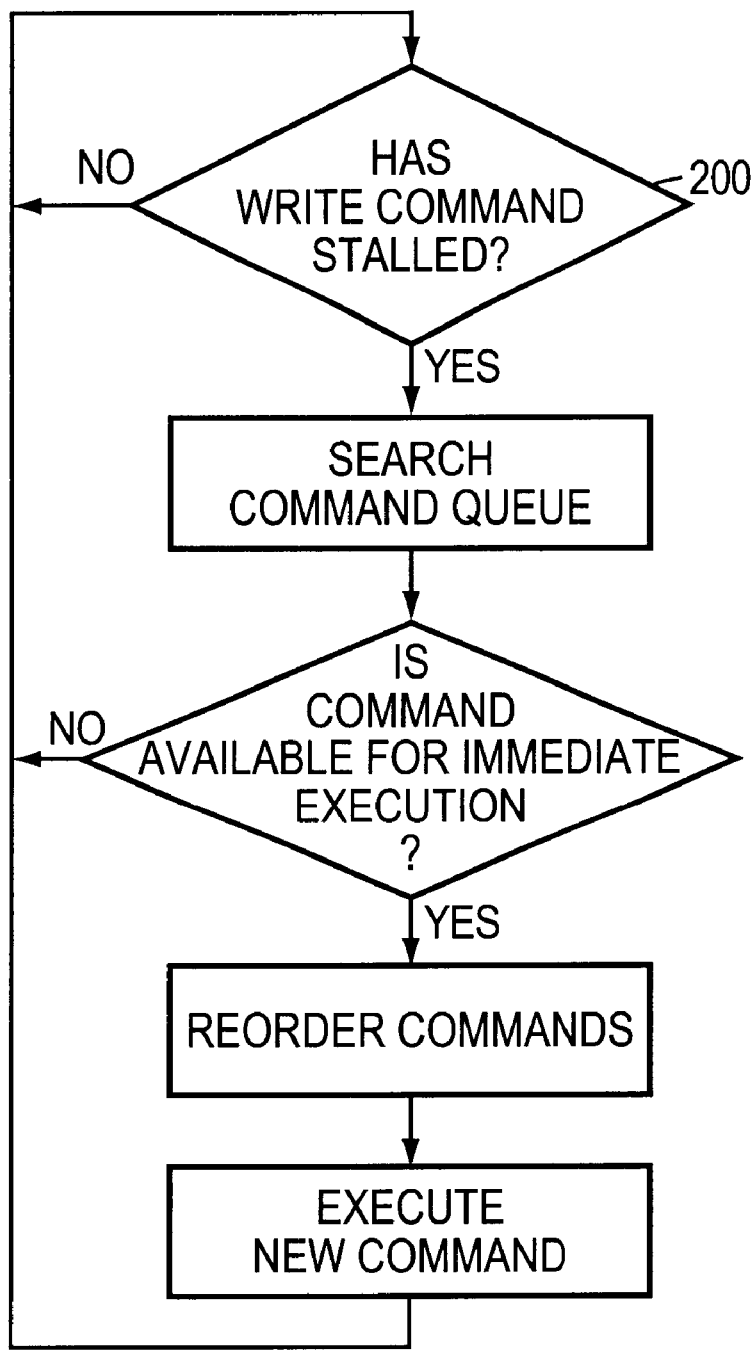
FIG. 3 is a flow chart illustrating a second aspect of system operation in accordance with the invention.

Referring to FIG. 3, consider a situation in which the disk drive controller is in a state where a write command cannot be immediately executed and completed because the cache slot required for the write data associated with that command is locked and/or otherwise unavailable. The disk drive controller, in accordance with the invention, must then search down the command list or queue to avoid stalling while waiting for the cache slot to become available. This is indicated at 200. The operation of the remainder of the flow diagram illustrated in FIG. 3 is the same as that noted above in connection with FIG. 2 for a relatively simple command reordering implementation. As noted above, however, other command reordering implementations can also be effective with further efficiencies by taking into account locality of reference, the types of commands, and other well-known performance enhancing methods.

Figure 4A:
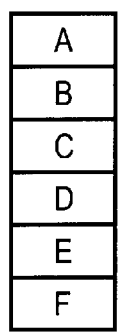
FIGS. 4A, 4B, 4C, and 4D illustrate a reordering sequence of the command queue.
Figure 4B:
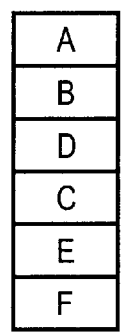
Figure 4C:
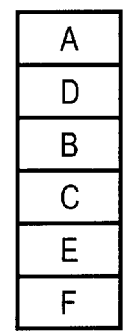
Figure 4D:
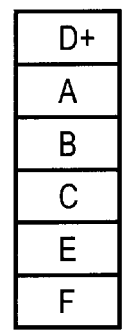

As noted above, referring to FIGS. 4A, 4B, 4C, and 4D, it is possible to approach the command reordering process by reordering the commands in the command queue before the actual implementation and execution of the command at the top of the queue takes place. In this aspect of the invention, consider a command queue as illustrated in FIG. 4A. The command queue has a sequence of read and write commands labeled A, B, C, D, . . . , F where F is the newest command to be added at the bottom or end of the list. The commands in the command queue 250 can be reordered even before, and without requiring, a so-called stalled command being in place. Thus, in accordance with the invention, a command which can be immediately completed, such as write commands where the cache slot is available for immediate execution and storage of the write data for later destaging to the disk drive or disk drive array, or read commands where the data exists in cache memory, can be moved up the list toward the beginning or top of the queue thereby replacing and forcing down those commands at the top of the queue which cannot be immediately implemented and/or completed. This process can result, in a reordering of the queue as illustrated in FIGS. 4B and 4C as command "D" moves upward.

It may occur, however, that in addition to the advantages noted above and the efficiencies which are achieved in the use of resources, that some commands once they are reordered to the top of the queue encounter delays in their execution. Such delays may occur, for example, because of a rewriting of cache, causing a cache miss. Nevertheless, in accordance with the illustrated embodiment of the invention, reordered commands which reach the head of the command queue can be and preferably are tagged (as indicated by the plus sign in FIG. 5D), so that they cannot be reordered downward, that is, they cannot be pushed toward the bottom of the queue, even by faster executing commands. Thus, in accordance with one embodiment of the invention, once a command has been reordered and reaches the beginning of the queue, it cannot be reordered again. Thus, as noted in FIG. 4D, the command "D", in a particular embodiment of the invention cannot be reordered after reaching the head of the queue, no matter what commands enter the queue. Commands A, B, and C will then be executed once command D is executed.

Thus, in accordance with the invention, the disk drive controller has the capability of recognizing stalled conditions due to resource unavailability and to take commands out of order or to reposition commands in the command queue in order to provide greater throughput and efficiencies. In a particular implementation of the EMC Symmetrix controller, such as that illustrated in FIG. 1, the command reordering capability is inserted into the SCSI adapter (SA) and the availability of data in cache memory or the availability of write cache are the primary criteria in determining whether to take commands out of order.

It is thus important to note the two aspects in which commands can be reordered. In one aspect, system driven, the system determines whether the time delay, for example, is excessive or is expected to be excessive, that is, to exceed a selected threshold value, and if so, a command is rendered inactive while another command is implemented. In the second embodiment of the invention, the command queue itself is reordered prior to the determination of possible delays so that faster executing instructions will "rise" to the top of the queue, and be executed more quickly than slower executing instructions which might be delayed depending upon resource availability at a particular period of time. These two approaches to command reordering may result in slightly different command sequence execution, but both instances will result in better data throughput, which is the prime importance of the invention.

Additions, subtractions, and other modifications of the disclosed preferred particular embodiments of the invention will be apparent to those practicing the field and are within the scope of the following claims.

What is claimed is:

1. A disk drive controller for reordering a sequence of read and write commands received from a plurality of host computers comprising:

circuitry for determining any time delays in completing an initiated read or write command, circuitry for initiating, if the time delay meets specified criteria, a next selected command of the sequence selected from commands in the received sequence, and circuitry for completing the next selected command of the sequence while at least a portion of said initiated read or write command is completing, wherein the next selected command is selected based upon a search of the sequence for one command that may be immediately executed and completed, the next selected command being initiated if a tag is associated with the next selected command, the tag indicating that initiation of the next selected command is not to be deferred in favor of initiation of any other command received in the sequence from the host computers.

2. The apparatus of claim 1 wherein said specified criteria include a failure to write data to a memory for destaging.

3. A disk drive controller for reordering a sequence of read and write commands received from a plurality of host computers, the controller comprising:

memory for storing a command list of read and write commands in an order corresponding to when the read and write commands are received at the controller, circuitry for adding newly received commands to the end of the command list, the command at the beginning of the list being the next command to be executed by the disk drive controller, position altering circuitry for moving, prior to initiation of execution of the command at the beginning of the list, a selected command in the list from a position more distant from the beginning of the list to a position less distant from the beginning of the list when that selected command can be executed and completed without undesired delay, execution circuitry for executing a command near the top of the list, circuitry for associating a tag with the selected command, the tag indicating that execution of the selected command is not to be deferred in favor of execution of any other command, the circuitry for adding being configured to receive into the list another command that the disk drive controller is able to execute more quickly than the disk drive controller is able to execute the selected command, the another command being received into the list after the selected command is associated with the tag and prior to the execution of the selected command by the disk drive controller, and the circuitry for executing being configured to execute the selected command prior to executing the another command.

4. The disk drive controller of claim 3, further comprising:

circuitry for repeatedly operating the moving circuitry a plural number of times, and said executing circuitry executing the instruction closest to the beginning of the list.

5. A method for reordering, at a disk drive controller, a sequence of read and write commands received form a plurality of host computers comprising the steps of:

determining, at the disk drive controller, any time delays in completing an initiated read or write command at the disk drive controller, initiating at the disk drive controller, if the time delay meets specified criteria, a next selected command of the sequence selected from commands in the received sequence, and completing, at the disk drive controller, said next selected command of the sequence while at least a portion of said initiated read or write command is completing, wherein the next selected command is selected based upon a search of the sequence for one command that may be immediately executed and completed, the next selected command being initiated if a tag is associated with the next selected command, the tag indicating that initiation of the next selected command is not to be deferred in favor of initiation of any other command received in the sequence from the host computers.

6. The method of claim 5 further wherein said specified criteria includes an expected time to complete threshold.

7. The method of claim 5 wherein said specified criteria include a failure to write data to memory for destaging.

8. A method for reordering, at a disk drive controller, a sequence of read and write commands received from a plurality of host computers, the method comprising, at the disk drive controller:

storing in a command list said read and write commands in an order corresponding to when the read and write commands are received at said controller, adding each newly received command to the end of the command list, the command at the beginning of the list being the next command to be executed by the disk drive controller, moving, prior to initiation of execution of the command at the beginning of the list, a selected command in the list from a position more distant from the beginning of the list to a position less distant from the beginning of the list when that selected command can be executed and completed without undesired delay, executing a command near the top of the list, associating a tag with the selected command, the tag indicating that execution of the selected command is not to be deferred in favor of execution of any other command, receiving in the list another command that the disk drive controller is able to execute more quickly than the disk drive controller is able to execute the selected command, the another command being received in the list after the selected command is associated with the tag and prior to the execution of the selected command by the disk drive controller, and executing the selected command prior to executing the another command.

9. The method of claim 8 further comprising the steps of:

repeating said moving step plural times, and wherein said executing step comprises the step of executing the command at said beginning of said list.

10. The method of claim 8 further wherein said executing step comprises the step of executing the command at the beginning of the list.

11. The method of claim 9 wherein the executed command is a write instruction.

* * * * *